(12) United States Patent
Naeem

(10) Patent No.: US 6,193,832 B1
(45) Date of Patent: *Feb. 27, 2001

(54) METHOD OF MAKING DIELECTRIC CATALYST STRUCTURES

(75) Inventor: Munir-ud-Din Naeem, Poughkeepsie, NY (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/900,406

(22) Filed: Jul. 25, 1997

(51) Int. Cl.[7] .......................... B32B 31/12; B32B 31/18; B05D 1/36; H05H 1/00

(52) U.S. Cl. .......................... 156/250; 156/278; 427/404; 427/419.1; 427/419.2; 427/470; 427/533; 427/539

(58) Field of Search .......................... 156/89.12, 89.14, 156/89.16, 89.17, 89.18, 89.19, 250, 278, 279; 264/614; 427/124, 125, 126.2, 96, 99, 402, 404, 419.1, 419.2, 533, 539, 581, 585, 470; 502/439

(56) References Cited

U.S. PATENT DOCUMENTS

| | | |
|---|---|---|
| 3,598,635 | 8/1971 | Sagona . |
| 3,923,696 * | 12/1975 | Chart et al. . |
| 3,928,533 * | 12/1975 | Beall et al. . |
| 3,930,890 * | 1/1976 | Dietz ..................... 136/179 |
| 3,966,646 * | 6/1976 | Noakes et al. .......... 252/477 |
| 3,979,193 | 9/1976 | Sikich . |
| 4,094,652 * | 6/1978 | Lowther ..................... 55/33 |
| 4,149,998 * | 4/1979 | Tauster et al. . |
| 4,159,353 | 6/1979 | Adelsberg et al. . |
| 4,450,244 * | 5/1984 | Domesle et al. . |
| 4,465,576 | 8/1984 | Negishi et al. . |
| 4,557,796 | 12/1985 | Druschke et al. . |
| 4,703,028 * | 10/1987 | Steininger ............... 502/439 X |
| 4,711,009 * | 12/1987 | Cornelison et al. ........ 29/157 R |
| 4,780,277 | 10/1988 | Tanaka et al. . |
| 4,804,796 * | 2/1989 | Wang et al. ............... 585/269 |
| 4,910,180 * | 3/1990 | Berndt et al. . |
| 4,976,929 * | 12/1990 | Cornelison et al. ......... 422/174 |
| 4,992,407 * | 2/1991 | Chakraborty et al. . |
| 5,114,901 * | 5/1992 | Tsang et al. ............. 502/439 X |
| 5,229,345 * | 7/1993 | Logothetis et al. . |
| 5,234,882 * | 8/1993 | Pfefferle ................ 502/439 X |
| 5,236,672 | 8/1993 | Nunez et al. . |
| 5,248,564 * | 9/1993 | Ramesh ..................... 428/688 |
| 5,313,089 * | 5/1994 | Jones, Jr. .................. 257/295 |
| 5,316,738 * | 5/1994 | Kojima et al. ............. 422/180 |
| 5,371,056 * | 12/1994 | Leyrer et al. . |
| 5,407,880 * | 4/1995 | Ikeda et al. ............. 502/439 X |
| 5,441,706 * | 8/1995 | Whittenberger ............ 422/174 |
| 5,490,973 | 2/1996 | Grothaus et al. . |
| 5,496,788 * | 3/1996 | Domesle et al. .......... 502/439 X |
| 5,512,251 * | 4/1996 | Brunson et al. .......... 502/439 X |
| 5,525,570 | 6/1996 | Chakraborty et al. . |
| 5,525,834 | 6/1996 | Fischer et al. ............. 257/691 |

(List continued on next page.)

Primary Examiner—Curtis Mayes
(74) Attorney, Agent, or Firm—Daryl K. Neff

(57) ABSTRACT

A reactor for corona destruction of volatile organic compounds (VOCs), a multi-surface catalyst for the reactor and a method of making the catalyst for the reactor. The reactor has a catalyst of a high dielectric material with an enhanced surface area. A catalyst layer stack is formed by depositing a high dielectric layer on a substrate and, then depositing a conductive layer on the dielectric layer. The catalyst layer stack is bombarded by low RF energy ions to form an enhanced surface area and to form a protective layer over the conductive layer. Catalyst layer stacks may be joined back to form double-sided catalyst layer stacks. The catalyst layer stack may be diced into small pieces that are used in the reactor or the whole catalyst layer stack may be used.

17 Claims, 4 Drawing Sheets

U.S. PATENT DOCUMENTS

| | | | |
|---|---|---|---|
| 5,604,174 * | 2/1997 | Friedman et al. | 502/439 |
| 5,609,736 | 3/1997 | Yamamoto | 204/164 |
| 5,632,961 * | 5/1997 | Sheller | 502/439 X |
| 5,696,394 | 12/1997 | Jones, Jr. et al. | 257/295 |
| 5,721,043 | 2/1998 | Summerfelt et al. | 428/210 |
| 5,721,188 * | 2/1998 | Sung et al. | 502/439 |
| 5,736,422 | 4/1998 | Lee et al. | 437/201 |
| 5,756,223 | 5/1998 | Cameron et al. | 428/688 |
| 5,776,621 | 7/1998 | Nashimoto | 428/688 |
| 5,786,097 | 7/1998 | Scanlan | 428/469 |
| 5,804,323 | 9/1998 | McKee et al. | 428/700 |
| 5,837,405 | 11/1998 | Tomofuji et al. | 430/5 |
| 5,849,669 | 12/1998 | Wen | 505/190 |
| 5,851,948 * | 12/1998 | Chuang et al. | |
| 5,866,238 | 2/1999 | Takayama et al. | 428/209 |
| 5,880,508 | 3/1999 | Wu | 257/411 |
| 5,914,015 | 6/1999 | Barlow et al. | |

* cited by examiner

“METHOD OF MAKING DIELECTRIC CATALYST STRUCTURES”

Related Application Data

This application is related to the following applications which are assigned to the same owner and filed on even date herewith: "Catalytic Reactor" U.S. patent application Ser. No. 08/900,405, "Dielectric Catalyst Structures" U.S. patent application Ser. No. 08/900,404 now U.S. Pat. No. 6,130,182.

BACKGROUND OF THE INVENTION

1. Field of the Invention

The present invention relates to catalyst materials and more specifically, to a method for making dielectric catalyst materials for use in catalytic reactors which produce high electric fields or corona discharge.

2. Background Description

Corona destruction of volatile organic compounds (VOCs) is a method of disposing of noxious or toxic gases or other atmospheric contaminants or pollutants. The unwanted gas is decomposed into a less polluting gas that may be vented into the atmosphere. The unwanted gases, generally VOC, are passed over a bed of catalyst in a reactor, while a high alternating current (AC) voltage is passed across the bed to produce a corona discharge. A dielectric material catalyst in the reactor produces a stable corona and the VOCs are converted to $CO_2$ gas.

Typically, prior art reactors are large and expensive. Further these large reactors require, typically, at least 10 kilovolts (kV) to generate the corona.

Thus, there is a need for cheaper, smaller, more compact reactors that are effective at lower voltage.

In addition to decomposing VOCs, catalytic reactors are used with high electric fields or corona discharge to facilitate a variety of chemical reactions.

PURPOSES OF THE INVENTION

It is a purpose of the invention to provide a simplified process of making dielectric catalyst structures.

It is another purpose of the invention to provide a process of making dielectric catalyst structures having an enhanced surface area for contact with reagent gases.

It is yet another purpose of the invention to provide a process of making dielectric catalyst structures with a surface coating which protects an underlying conductive layer and enhances the surface area of the catalyst structure.

SUMMARY OF THE INVENTION

These and other objects are provided by the method of making dielectric catalyst structure of the present invention. According to a first embodiment, a layer of dielectric material having a high dielectric constant is formed on a substrate of semiconductor or nonconductor material, i.e. a material which is not essentially conductive. A layer of conducting material is then formed on the dielectric layer, which is then oxidized to form a protective coating on the conducting layer.

Preferably, the dielectric material is selected from the group consisting of barium titanate ($BaTiO_3$), strontium titanate ($SrTiO_3$), lead zirconium titanate (PZT), and zeolites, and the conducting layer preferably includes one or more metals selected from the group consisting of copper, gold, aluminum, titanium, tungsten, nickel, palladium, and platinum. Preferably, the step of oxidation is performed by bombarding the conducting material with ions in an oxygen-rich plasma at low radio frequency (RF) energies of about 500 electron volts or less.

In a preferred embodiment of the invention, a waste wafer, having been processed through one or several steps in fabricating electrical devices is utilized as a substrate upon which layers of high dielectric and conducting materials are formed and the conducting layer is oxidized to form a catalyst structure. In a highly preferred embodiment, the catalyst structure is joined with another such catalyst structure in substrate to substrate fashion to form a double-sided catalyst structure having exterior conducting layers with rough conditioned enhanced surface areas. Alternatively, or in addition to forming double-sided catalyst structures bonded substrate to substrate, the catalyst structure may be diced into a plurality of catalyst pieces for use in a catalyst bed of a reactor.

BRIEF DESCRIPTION OF THE DRAWINGS

The foregoing and other objects, aspects and advantages will be better understood from the following detailed description of a preferred embodiment of the invention with reference to the figures, in which.

DETAILED DESCRIPTION OF A PREFERRED EMBODIMENT OF THE INVENTION

Figure 1:
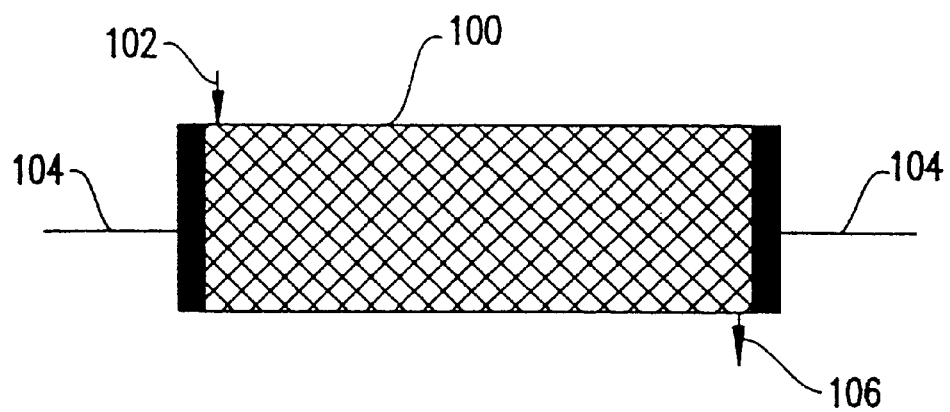
FIG. 1 is a schematic representation of a first preferred embodiment of the present invention.

A preferred embodiment of the present invention is a catalytic reactor, preferably a multi-surface reactor for corona destruction of volatile organic compounds (VOCs). In a first preferred embodiment, as represented schematically in FIG. 1, the reactor includes a vessel 100 filled with catalyst coated substrate pieces (as represented by the cross-hatching). Preferably, vessel 100 is cylindrical. Noxious or polluting gas enters reactor vessel 100 through an inlet 102. Alternating current (AC) is applied to reactor 100 at electrodes 104 to generate a corona therein. Preferable, electrodes 104 are located at opposite ends of the cylindrical reactor vessel 100. A gaseous mixture of unwanted gases such as volatile organic compounds, e.g. hydrocarbons, chlorinated hydrocarbons and desirable gases, e.g. air, enters reactor vessel 100 filters through the catalyst coated substrate pieces, exiting through outlet 106. Gas in the reactor is exposed to the corona in the presence of the catalyst as it filters through the reactor 100. The resulting decontaminated gas and reaction byproducts exit through the outlet 106.

Figure 2:
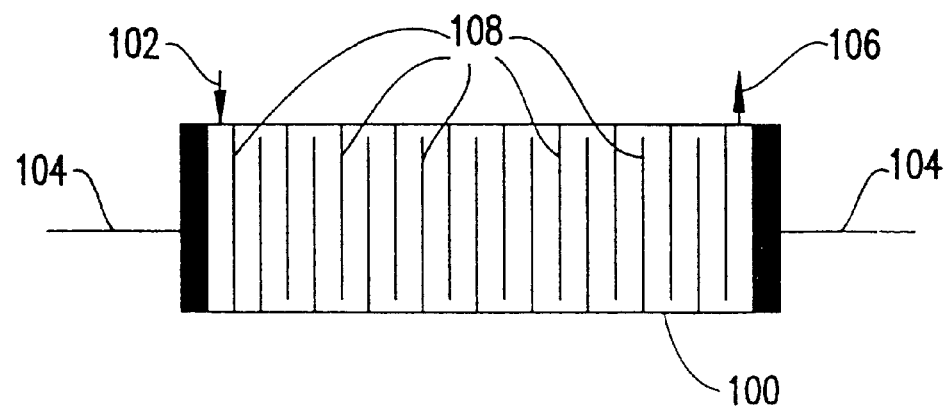
FIG. 2 is a schematic representation of a second preferred embodiment of the present invention.

FIG. 2 schematically represents a second embodiment wherein, reactor vessel 100 includes catalyst coated substrate plates or wafers 108 arranged in parallel with a space between adjacent parallel plates 108. The catalyst coated plates 108 of the second embodiment are of identical material and construction as the catalyst coated pieces of the first embodiment. In this embodiment, noxious or polluting gas enters reactor 100 through an inlet 102 and passes between parallel plates 108, along a maze-like path formed by the arrangement of plates until the resultant gas exits at outlet 106. The gas is exposed to the corona as it passes through the reactor 100.

Figure 3A:
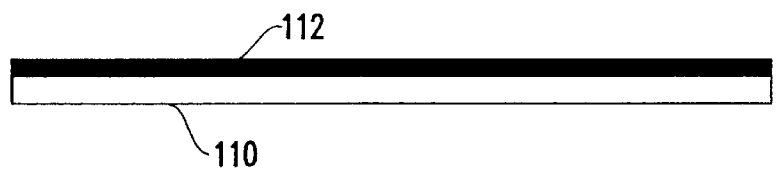
FIGS. 3A–C represent the steps in forming catalyst coated substrates according to a preferred embodiment of the present invention.
Figure 3B:
Figure 3C:
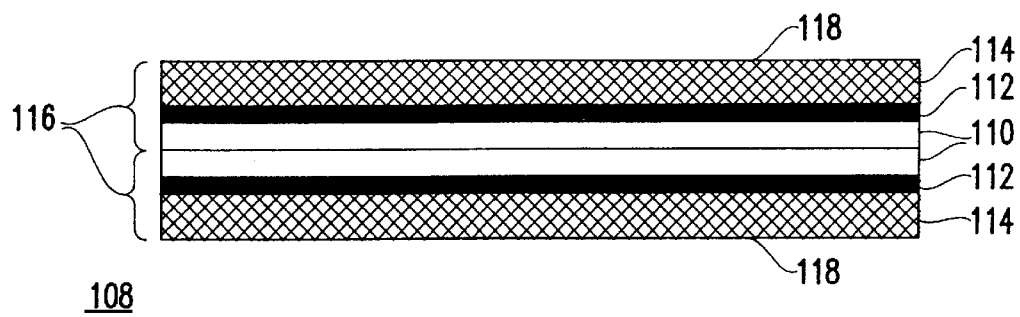

FIGS. 3A–C represent the steps in forming the catalyst coated plates or wafers 108. Plates or wafers 108 include a substrate having at least an outer layer of semiconductor or nonsemiconductor material, which material is typically and preferably silicon (Si). First, in FIG. 3A, a high dielectric (K) material is deposited on a substrate plate or wafer 110. The substrate plate or wafer may be a waste substrate or wafer having been processed through one, several, or all steps for fabricating electronic devices or integrated circuits, so long as the substrate is not composed entirely of conductor material and has esssentially a semiconductive or non-conductive outer surface.

Preferably, dielectric film 112 is sputter deposited in an $O_2/Ar$ atmosphere (5%50 by volume) by radio frequency (RF) or DC magnetron sputtering from a titanate target, preferably a titanate of barium (Ba) or strontium (Sr) such as $BaTiO_3$ or $SrTiO_3$. Alternatively, a target of lead zirconium titanate (PZT) or a zeolite material may be used for deposition of dielectric film 112. Dielectric film 112 is 1–500 nanometer (nm) thick, typically 200–300 nm and preferably 250 nm in thickness.

Alternatively, film 112 may be formed by electron beam evaporation or chemical vapor deposition (CVD) or wet chemical deposition.

Next, in FIG. 3B, a conducting film 114 is formed on the high dielectric film 112 to form a film stack 116. Preferably, conducting film 114 is a layer including copper (Cu), of thickness between 5–500 nm, typically 20–100 nm, and preferably 50 nm. Alternatively, any suitable metal such as gold (Au), aluminum (Al), Titanium (Ti), Tungsten (W), nickel (Ni), palladium (Pd) or platinum (Pt) may be substituted for copper. Conducting film 114 may be formed by any suitable method such as sputtering, CVD, electroplating or electron beam (e-beam) evaporation.

Next, the film stack 116 is bombarded with oxygen ions using low energy radio frequency RF to form a rough surface oxide film on the surface 118 of conducting film 114, thereby increasing the area of surface 118. The thin oxide film thus formed protects the conducting film 114 from corrosion while increasing the surface area of the catalyst in contact with the gaseous mixtures. Surface area enhancement and metal oxide formation is performed in an $O_2/Ar$ mixture between 0.2 to 1 by volume, preferably 0.5. Alternatively, an appropriate inert or non-reactive gas may be substituted for Ar. The $O_2/Ar$ mixture total flow rate is between 50 to 300 standard cubic centimeters per minute (sccm), typically 50 to 250 sccm and, preferably, 100 sccm. Pressure is maintained between 100 to 500 mT, typically 200–400 mT and, preferably, 300 mT.

The plate or wafer is mounted on a chuck with Helium (He) backside cooling to maintain the film temperature below 300° C. Helium pressure is maintained between 4 and 30 torr, typically, 4 to 14 torr and, preferably, 9 torr. The chamber wall and cathode temperatures are maintained between 5 to 60° C., with typical wall temperature between 16–50° C., preferably at 36.5° C. and with typical cathode temperature 8–20° C., preferably at 16.2° C. RF power between 300 to 1400 W, typically 500–900 W and, preferably, 700 W is applied to bombard the target with ion energy below 500 eV for 10 to 70 seconds, typically between 40–60 seconds and preferably, 50 seconds using up to a 90 Gauss magnetic field, typically 40–70 Gauss and, preferably 60 Gauss.

Finally, in FIG. 3C, two identical film stacks 116 are joined back to back, forming a catalyst coated plate or wafer 106. Alternatively, two plates of different construction according to the embodiments disclosed herein may be joined back to back. The plate or wafer may be used in constructing a reactor according to a second preferred embodiment (FIG. 2) or, cut into relatively small pieces for use in a reactor constructed according to a first preferred embodiment (FIG. 1).

Figure 4:
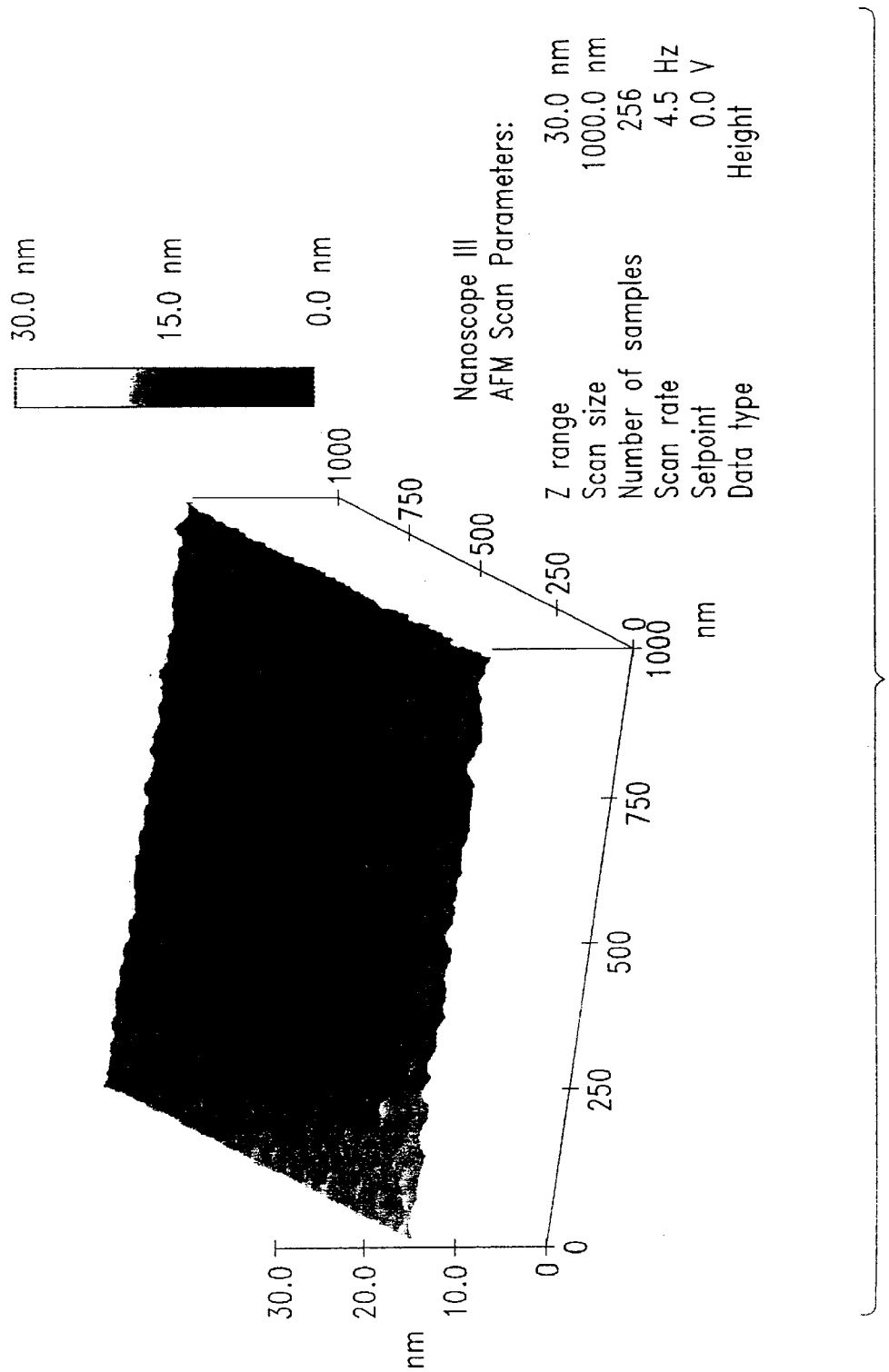
FIG. 4 is a reproduction of an atomic force microscopy image of conducting film 114 formed without ion bombardment.
Figure 5:
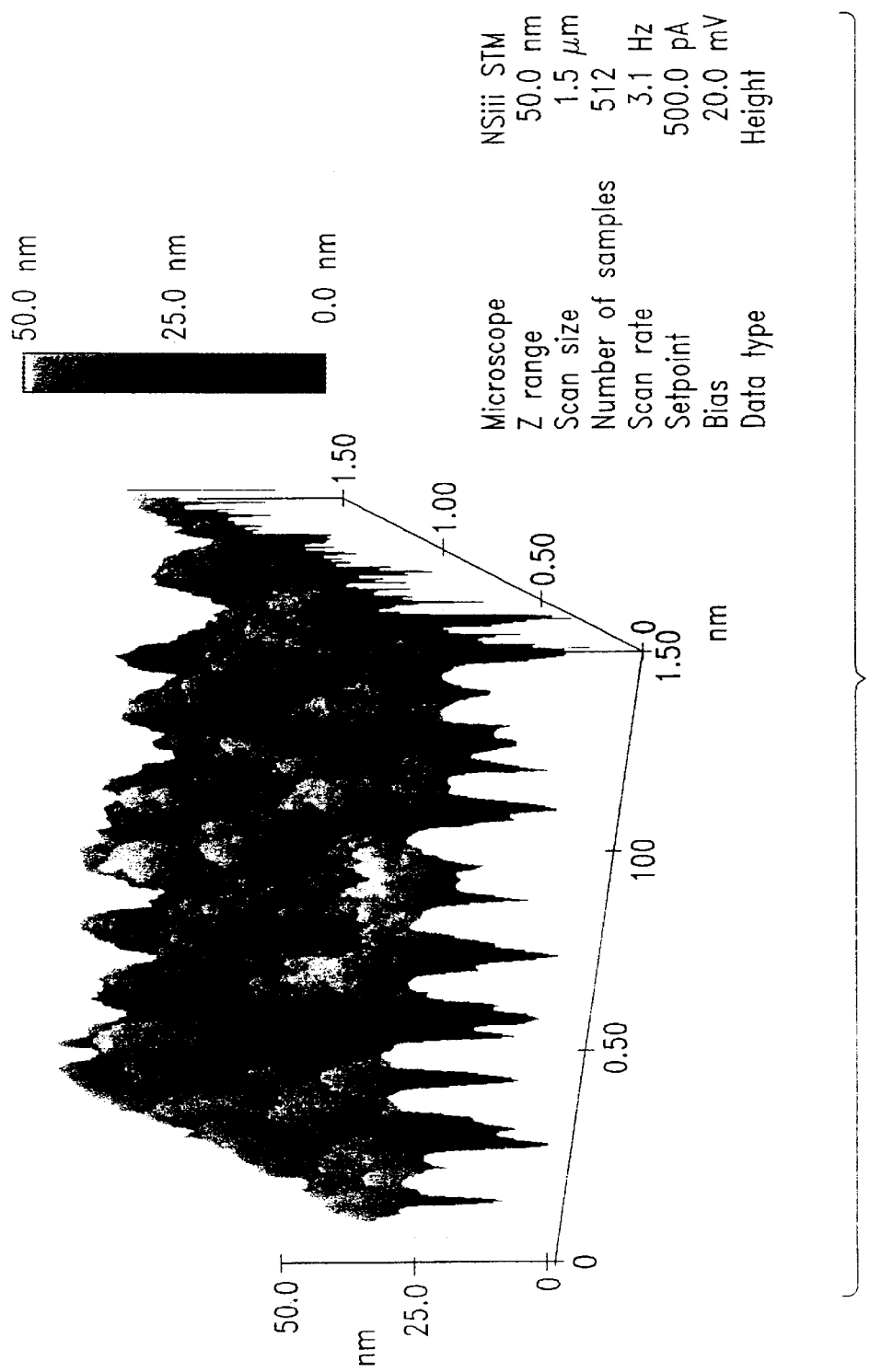
FIG. 5 is a reproduction of an atomic force microscopy image of conducting film 114 after ion bombardment according to the preferred embodiment of the present invention.

FIG. 4 is a reproduction of an atomic force microscopy image of conducting film 114 prior to surface area enhancement using ion bombardment, at which time the surface 118 is fairly smooth. FIG. 5 is a reproduction of an atomic force microscopy image of conducting film 114 after ion bombardment performed according to the preferred embodiment of the present invention. As will be recognized, the surface area of surface 118 shown in FIG. 5 exhibits considerable surface area enhancement over the smoother surface 118 shown in FIG. 4.

While the invention has been described with reference to certain preferred embodiments thereof, those skilled in the art will recognize that many modifications of the invention can be practiced within the spirit and scope of the appended claims.

I claim:

1. A method of forming a catalyst structure comprising:
  a) forming a layer of dielectric material on an essentially non-metallic substrate;
  b) forming a layer of conducting material on said dielectric layer, said conducting material being sufficiently conductive and said dielectric material having a sufficiently high dielectric constant such that a corona discharge is produced upon application of a voltage across said catalyst structure; and
  c) oxidizing to condition said conducting layer such that an outer surface thereof is roughened and enhanced in surface area; and
  bonding said catalyst structure to a second catalyst structure formed according to said steps a) through c) in such manner that said oxidized conducting layers face outward.

2. The method of claim 1 comprising the further step of dicing said bonded catalyst structure into a plurality of catalyst pieces.

3. A method of forming a catalyst structure comprising:
  a) forming a layer of dielectric material on an essentially non-metallic substrate including silicon, said dielectric material including a material selected from the group consisting of lead zirconium titanate (PZT), $BaTiO_3$, $SrTiO_3$, and zeolites;
  b) forming a layer of conducting material on said dielectric layer, said conducting material being sufficiently conductive and said dielectric material having a sufficiently high dielectric constant such that a corona discharge is produced upon application of a voltage across said catalyst structure, said conducting layer consisting essentially of copper; and
  c) oxidizing said conducting layer.

4. A method of forming a catalyst structure comprising:
  a) forming a layer of dielectric material on an essentially non-metallic substrate;

b) forming a layer of conducting material on said dielectric layer, said conducting material being sufficiently conductive and said dielectric material having a sufficiently high dielectric constant such that a corona discharge is produced upon application of a voltage across said catalyst structure; and c) oxidizing to condition said conducting layer such that an outer surface thereof is roughened and enhanced in surface area, said step of oxidizing including bombarding said conducting layer with ions at relatively low energies.

5. The method of claim 4 wherein said bombarding is performed with oxygen molecules and a nonreactive gas at ion energies of about 500 electron volts or less.

6. The method of claim 4 wherein said dielectric material layer includes a material selected from the group consisting of lead zirconium titanate (PZT), $BaTiO_3$, $SrTiO_3$, and zeolites.

7. The method of claim 6 wherein said conducting layer consists essentially of one or more metals selected from the group consisting of copper, gold, aluminum, titanium, tungsten, nickel, palladium, and platinum.

8. A method of forming a catalyst structure comprising:

a) forming a layer of dielectric material selected from the group consisting of lead zirconium titanate (PZT), $BaTiO_3$ $SrTiO_3$, and zeolites on a substrate;

b) forming a layer of conducting material on said dielectric layer; and c) forming a thin oxide layer on said conducting layer to form an increased surface area catalyst structure by bombarding said conducting layer with oxygen ions.

9. The method of claim 8 wherein said step of forming said thin oxide layer includes exposing said conducting layer to an alternating field plasma in the presence of oxygen.

10. The method of claim 8 wherein said bombarding is performed at relatively low ion energies.

11. The method of claim 10 wherein said bombarding is performed in the presence of oxygen and a nonreactive gas at ion energies below 500 electron volts.

12. The method of claim 8 comprising the further step of bonding said catalyst structure to a second catalyst structure formed according to said steps a) through c) in such manner that said oxidized conducting layers face outward.

13. The method of claim 12 comprising the further step of dicing said bonded catalyst structure into a plurality of catalyst pieces.

14. The method of claim 8 wherein said dielectric material layer includes a material selected from the group consisting of lead zirconium titanate (PZT), $BaTiO_3$, $SrTiO_3$, and zeolites.

15. The method of claim 14 wherein said conducting layer consists essentially of one or more metals selected from the group consisting of copper, gold, aluminum, titanium, tungsten, nickel, palladium, and platinum.

16. The method of claim 15 wherein said substrate material includes silicon, and said conducting layer consists essentially of copper.

17. A method of forming a catalyst structure comprising:

a) forming a layer of a dielectric material selected from the group consisting of lead zirconium titanate (PZT), $BaTiO_3$, $SrTiO_3$, and zeolites on a substrate including semiconductor material;

b) forming a layer of conducting material on said dielectric layer, said conducting material consisting of one or more metals selected from the group consisting of copper, gold, aluminum, titanium, tungsten, nickel, palladium, and platinum; and c) bombarding said conducting material layer with ions at relatively low radio frequency energies in an oxygen atmosphere to form an enhanced surface area catalyst structure layer.

* * * * *